United States Patent [19]

Trandell et al.

[11] 3,873,462

[45] Mar. 25, 1975

[54] COBALT MODIFIED IRON OXIDES

[75] Inventors: Roger Francis Trandell, Bridgewater, Mass.; Robert Glenn Fessler, Martinsville, N.J.

[73] Assignee: American Cyanamid Company, Stamford, Conn.

[22] Filed: Apr. 27, 1973

[21] Appl. No.: 355,241

[52] U.S. Cl. .............................. 252/62.56, 423/634

[51] Int. Cl. . C01g 49/08, C04b 35/26, C04b 35/64

[58] Field of Search .................. 252/62.56; 423/634

[56] References Cited

UNITED STATES PATENTS

| | | | |
|---|---|---|---|
| 3,081,264 | 3/1963 | Nobuoka et al. | 252/62.56 |
| 3,117,933 | 1/1964 | Abeck et al. | 252/62.56 |
| 3,573,980 | 4/1971 | Haller et al. | 252/62.56 |
| 3,671,435 | 6/1972 | Hwang | 252/62.56 |
| 3,720,618 | 3/1973 | Toda et al. | 252/62.56 |

*Primary Examiner*—Edward J. Meros
*Assistant Examiner*—Eugene T. Wheelock
*Attorney, Agent, or Firm*—John L. Sullivan

[57] ABSTRACT

Acicular, gamma, cobalt-modified, iron oxide, magnetic particles produced by: coprecipitation of about 25 percent of the ferrous and cobaltous ions in a slightly alkaline aqueous medium; thereafter oxidize to a slightly acid medium; coprecipitate balance of metallic ions and oxidize; recover the $\alpha$ form of cobalt-modified ferric oxide; reduce particles with hydrogen; and, thereafter oxidize to the gamma form, which process is characterized by almost quantative recovery of the cobaltous ion by raising the pH to about 10 of the slurry containing the $\alpha$ particles.

1 Claim, No Drawings

COBALT MODIFIED IRON OXIDES

This invention relates to the preparation of acicular (needle-shaped) cobalt-containing non-magnetic alpha ferric hydroxide hydrate and to improved ferromagnetic cobalt-doped gamma ferric oxide (gamma $Fe_2O_3$); and to a method for the preparation of the said products whereby the amount of cobalt incorporated into the product may be controlled as desired and whereby the products obtained by the process exhibit a linear relationship between the cobalt content of the product and a variation of the X-ray diffraction pattern as the cobalt content of the product varies.

The use of magnetic iron oxide powder for magnetic recording tapes and other magnetigram carriers is well known. Various methods have been disclosed in the past to produce a cobalt-containing (cobalt doped) iron oxide with improved properties for magnetic recording purposes. Thus, for example, in U.S. Pat. No. 3,117,933 there is disclosed a method whereby the cobalt-containing particles of gamma ferric oxide (gamma $Fe_2O_3$) are produced wherein the product has a cobalt content of about 1 to 10 atom percent with a relative large coercivity and remanence.

In the process of the above patent reference, typical of previous processes, an aqueous solution of a water soluble ferrous and a cobaltous salt in the presence of sufficient base to produce a pH of about 4.5 to 6.5, is treated with an oxygen-containing gas at about 0° to 30°C. thereby forming cobalt-containing gamma ferric oxide hydrate. This is then converted to cobalt-containing gamma ferric oxide by dehydration and subsequent reduction and oxidation.

The present invention is based on the discovery of a method for the preparation of a cobalt-containing non-magnetic alpha ferric oxide hydrate which is then in one step dehydrated and reduced to a black ferromagnetic cobalt-doped $Fe_3O_4$ which is thereafter oxidized with air to provide the final acicular cobalt-doped gamma $Fe_2O_3$.

The improved process of this invention is particularly useful in that it allows the process to be controlled so that cobalt-doped gamma $Fe_2O_3$ of a particular cobalt content may be obtained. Thus, it is possible to prepare products as desired which have a particular desired percent cobalt and the resultant magnetic properties.

Such products of the invention are acicular cobalt-doped, gamma ferric oxides having from 1 to 10 percent cobalt content characterized in that the relation of the percent cobalt in the product to the X-ray diffraction peak is expresssed by a linear relationship between 1. an X-ray diffraction peak at 1.47445±0.00012A for 1 percent cobalt content, and,
2. an X-ray diffraction peak at 1.47920±0.00012A units for 10 percent cobalt.

A unique feature of the process of the invention and the products thus prepared is the subsequent correlation of the relationship between the cobalt content of the product and the variation of the spacings of the X-ray diffraction patterns, particularly with respect to the variation of the most intense peak. A further feature of the products of the invention is the linear relationship between the percent cobalt of the product and the magnetic properties expressed as coercivity. This is shown by the preferred products which have a cobalt content of from 1 to 5 percent and are characterized by an X-ray diffraction peak lying within the region defined by cobalt content in a linear relationship established by a diffraction peak of 1.4748±0.0001 for 1.14 percent cobalt and a diffraction peak of 1.4767±0.0001 for 4.90 percent cobalt.

It is possible using the process of this invention to tailor the product as to coercivity exactly by controlling the amount of cobalt which is present in the product obtained and in turn achieve a higher coercivity than previously known for such a cobalt content.

The process of the invention is an improvement over known processes for now predictable coercivity is possible rather than the random values obtained by prior methods. It is possible through the use of the process of this invention to directly tailor the product for the specific end use.

This, therefore, affords a method for making a product of a desired coercivity by controlling the cobalt content. Thus, if we control the cobalt content, we can control and predict the coercivity value for the product. By the method of the invention, the amount of cobalt incorporated with the product may be controlled exactly according to the stoichiometric ratios of materials used since by our process all of the cobalt which goes into the reaction process may be retained as material incorporated in the product. This is not true of other known processes since in general, in other processes only an indeterminate proportion of the cobalt put into the product. In addition, with respect to the product obtained by known processes, where random amounts of cobalt are incorporated into the final product, the magnetic properties expressed as coercivity are not correlated with the cobalt content of the product. Instead of the linear relationship observed for the product prepared by the process of our invention, the magnetic properties appear to arise at random with either no definite linear relationship between cobalt content and properties or with a much different relationship than the products of our invention.

In addition, the products prepared by the prior art processes show no correlation as to a linear relationship between the percent cobalt and the change in X-ray diffraction spacings with respect to the intense peaks.

The products are obtained in such form that their physical characteristics make them particularly suitable for forming improved final magnetic compositions for practical applications.

The advantage of the process may be seen in the possibility for obtaining products of varying coercivity depending on the purposes intended. Thus, for use in high quality audio records, a product with a lower coercivity is preferred; or for example, in video tape applications, a product of intermediate coercivity of between 450 to 700 is suitable; and for a process such as a credit card verification system, a product with a high coercivity of 700 to 1400 or above is suitable.

In the practice of the process of the invention, a non-magnetic alpha ferric oxide hydrate containing cobalt is first formed. This is achieved by adding to a solution of a water soluble ferrous salt and a water soluble cobaltous salt, a portion of an aqueous base solution with agitation, to result in a pH of about 6.5 to 8; and then blowing an oxygen containing gas through the system until the pH drops to about 5; heating the resulting slurry to about 65° to 100°C. and then continuing the blowing of oxygen containing gas through until the oxidation is complete, meanwhile maintaining the pH between about 4 and 5.2 by adding additional base solution sufficient to precipitate all of the iron; and then isolating the alpha ferric oxide hydrate containing the cobalt. For certain purposes to achieve further improvement, additional base solution may be added to the slurry to increase the pH from about 8.5 to 10 before isolation of the alpha ferric oxide hydrate. This latter variation results in a product with an increased proportionate amount of cobalt.

To obtain the acicular cobalt-doped gamma $Fe_2O_3$, the non-magnetic alpha ferric oxide hydrate is then dehydrated and reduced in one step with hydrogen at from 320°–400°C. providing black ferro magnetic cobalt-doped $Fe_3O_4$. This is thereafter oxidized with air providing the improved acicular cobalt-doped gamma $Fe_2O_3$.

The novel process of the invention may be represented in brief form by the following:

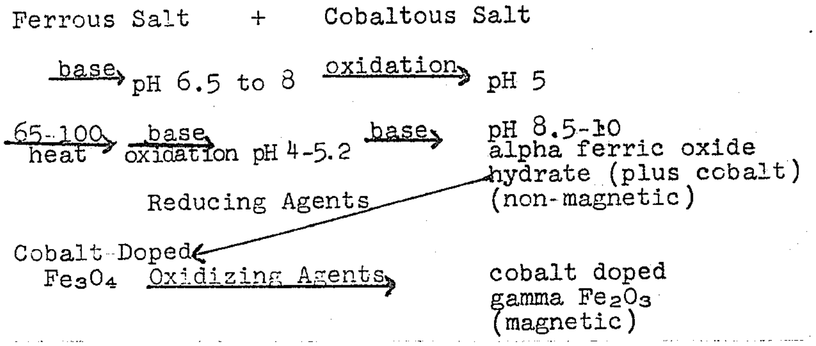

system is precipitated resulting in a cobalt-doped non-magnetic alpha ferric oxide hydrate which contains cobalt in the stoichiometric ratio which was present in the starting solution containing the ferrous and cobaltous salts.

Thus, in this way, it is possible to control critically the amount of cobalt incorporated into the final product.

In summation, there has been achieved a method of producing acicular cobalt doped ferromagnetic iron oxide ($Fe_2O_3$) by effecting an oxidation by passing an oxygen containing gas into a solution containing a water soluble ferrous salt and a water soluble cobaltous salt, the improvement which comprises passing the oxygen containing gas into the solution at a temperature of 15° to 40°C. at a pH between 6.5 and 8 until the pH drops to between about 3.5 and 6; heating the resulting slurry mixture to between about 65° and 100°C.; completing the oxidation with a gaseous oxidant while maintaining the pH between about 4 and 5.2 by the addition of an aqueous base solution; and, then isolating non-magnetic alpha ferric oxide hydrate containing cobalt which is subsequently dehydrated, reduced and then oxidized to acicular doped gamma $Fe_2O_3$.

The preparation of a cobalt-containing ferric oxide ($Fe_2O_3$) by the oxidation under basic conditions with an oxygen containing gas of a solution of water soluble ferrous and cobaltous salts followed by isolation of a ferric oxide hydrate which is subsequently dehydrated, reduced and then reoxidized to the final product, is disclosed in numerous references with various modifications.

However, in the process of this invention, it is specifically the alpha-ferric oxide hydrate formed in the prior steps which is subsequently dehydrated, reduced and reoxidized.

As stated above, the present invention is based on the discovery of conditions applied to such an overall process which affords a highly improved magnetic acicular gamma ferric oxide containing a certain predetermined and desired proportion of cobalt.

Referring to previous methods which have been disclosed, it may be pointed out in distinction that in our new process, the oxidation of the ferrous and cobaltous salt mixture is carried out starting at a pH of 6.5 to 8 allowing the pH then to drop to about 5 during the step of passing oxygen through the mixture. Further, the resulting slurry is heated at a temperature with agitation between 65° and 100°C., preferably about 90°C. until the oxidation is complete while maintaining a pH of 4.0 to 5.2 by the addition of additional base. In further contrast to other methods, only a non-magnetic alpha ferric oxide hydrate containing cobalt results instead of a gamma form or mixtures of various forms. This ferric oxide hydrate may be isolated from the solution by filtration, for example, the pH of the solution being between about 4.0 to 5.2. However, for the best results it is preferred to first add additional base to the slurry to increase the pH to between 8.5 and 10. In this way, it has been found that substantially all of the cobalt in the For practical purposes, it is desired to obtain the magnetic product in particles or crystals having a surface area of about 10 to 60 square meters/gram. To achieve this, the precipitation of the iron in the system by the addition of base such as sodium hydroxide is carried out step-wise. In so doing, a first portion amounting to about 15 to 40 percent of the stoichiometric equivalent of base for precipitation of the iron is first added resulting in a partial precipitation in the form of small crystals of surface areas of approximately 60 to 200 square meters/gram. This first portion of the caustic is added while maintaining the temperature of the reaction mixture between about 15° to 40°C., preferably between about 20° and 35°C. This first precipitation is referred to as the seed precipitation or the precipitation of seed crystals. The subsequent addition of the base such as sodium hydroxide for precipitation of the remaining iron present results in the building of larger crystals using the seed crystals as nuclei; this is a convenient way of obtaining particles of the desired final size having a surface area of about 10 to 60 square meters/-gram.

In the practice of the invention described more specifically, an aqueous solution of the ferrous salt and the cobaltous salt is provided with about 15 to about 20 percent by weight total solids content. While maintaining a temperature of about 15° to 40°C. in the mixture, from about 15 to 40 percent of the stoichiometric equivalent of an aqueous base is added with good agitation providing a pH of about 6.5 to 8. Preferably starting at a pH of about 7, the oxidizing gas reagent is passed through the system until the pH drops to about 3.5 to 6 and preferably 5. The slurry is then heated to about 65 to 100°C., preferably 90°C., and as stated above the oxidation is completed using the gaseous oxidant while maintaining the pH between about 4.0 and 5.2 by the addition of the remaining 60 to 85 percent of the stoichiometric equivalent of the aqueous base. The non-magnetic alpha ferric oxide hydrate, which is found after isolation, is further treated using conventional methods, for example, dehydration and reduction with hydrogen at from about 320°C., to 400°C. to provide a black ferro magnetic cobalt doped $Fe_3O_4$; which is thereafter oxidized with a gaseous oxidant to provide acicular cobalt doped gamma $Fe_2O_3$.

In the process of the invention, ferrous salts may be used such as ferrous sulfate, ferrous chloride, ferrous nitrate and the like corresponding cobaltous salts may be used. As the gaseous oxygen containing oxidant, there may be used oxygen or air; however, other oxidation agents could be used such as chlorine, nitrobenzene, etc. With respect to the basic material, water soluble inorganic bases are preferred, for example, sodium, potassium, calcium, barium or lithium hydroxide. Aqueous solutions of sodium hydroxide are preferred.

In contrast to prior art methods, the dehydration and reduction of the ferric oxide hydrate may be achieved in one step using a temperature above about 200°C., preferably about 320° to 400°C. with the use of a reducing gas, for example, such as hydrogen or carbon monoxide. Oxidation of the formed $Fe_3O_4$ is also accomplished in a conventional manner by oxidation with an oxygen containing gas such as oxygen or air at temperatures preferably above 200°C. The product obtained by the process of the invention may contain from 1 to about 10 atom percent of the cobalt per atom of iron, preferably from 1 to 5 percent. The content may be adjusted according to the ratio of the ferrous and cobalt salts used in the process to achieve the desired magnetic properties of the final products.

As we stated above, using prior art methods, it was generally not possible to control the cobalt content of the product nor was it possible with any accuracy to predict the magnetic properties of the cobalt containing ferric oxide according to the cobalt content.

The invention is illustrated more fully by the examples which follow.

EXAMPLE 1

Ten liters of 18.6 weight percent $FeSO_4$ solution and 0.77 liters of a 2.9 molar $Co(NO_3)_2$ solution (1.35 moles Co) were mixed and heated to 35°C.; then, 265cc of 50 percent NaOH was added. The pH of the resulting mixture was 6.5. This resulted in the precipitation of about 10 percent seed crystals. Using a gas dispersion disc, oxygen was passed into the mixture at a rate of 0.44 scfh for 40 minutes; the pH dropped to 5. The resulting seed slurry was heated to 80°C. over 30 minutes and an additional 1355 cc of 50% NaOH was added over a three hour period at a rate so as to maintain the pH at 5.0 to 6.0. A portion of the Co doped alpha FeOOH was isolated, dried and converted to gamma $Fe_2O_3$ by dehydration and reduction with hydrogen gas in a rotating kiln at 380°C. for two hours followed by oxidation with air at 320°C. for one hour. The magnetic product contained 2.30 percent Co and had an Hc of 501. The remainder of the slurry was adjusted to a pH of 8.5 by adding 77cc of NaOH. The non-magnetic alpha FeOOH isolated, dried and converted to gamma $Fe_2O_3$. The highly acicular uniform particles of Co doped gamma $Fe_2O_3$ contained 4.90 percent Co and had values of Hc=1402 and a squareness (j 10)=0.75 in magnetic recording tape.

EXAMPLE 2

Using a procedure similar to that described in Example 1 with certain exceptions, an additional batch of magnetic material was obtained. In this example, sufficient amount of cobalt nitrate solution was used to result in 1.79 moles of cobalt. An amount of sodium hydroxide solution was used in the first step to again result in a 10 percent precipitation of the iron as seed material.

The product contained 2.73 percent cobalt and had a Hc of 675.

EXAMPLE 3

Using a procedure similar to that described in Example 1, an additional batch of magnetic material was obtained. In this example, however, sufficient $Co(NO_3)_2$ was used to result in 0.725 moles cobalt; the oxygen flow rate was 0.1 scfh; and sufficient sodium hydroxide was used to precipitate 30% of the iron compound as seed material in the seed slurry.

The product precipitated at the pH of less than 6 contained 1.14 percent Co with an Hc of 388; the product precipitated at a pH greater than 8 contained 2.59 percent Co with an Hc of 673.

EXAMPLE 4

The procedure of Example 1 was repeated except that 0.695 moles of $Co(NO_3)_2$ was used; oxygen flow rate was 0.1 (scfh); sufficient sodium hydroxide was added in the initial step to cause 20 percent precipitation of the material as seed crystals conform.

The product precipitated at a pH of less than 6 contained 1.75% cobalt with an Hc of 429; that precipitated at a pH greater than 8 contained 2.32 percent cobalt with an Hc of 501.

EXAMPLE 5

Aqueous solutions of 178 gallons of 18.3 weight percent ferrous sulfate and 70 lbs. of 11.02 percent cobalt nitrate were mixed and heated to 35°C. To the solution was added 210 lbs. of 25 percent sodium hydroxide solution resulting in a pH of 6.9. Using a gas dispersion disc, oxygen was passed in at 0.414 scfm* for 105 minutes resulting in a pH of 4.5. This seed slurry (25% of the iron precipitated) was heated to 90°C. over 30 minutes and then 539 lbs. of 25 percent sodium hydroxide solution was added over 5 hours at a rate to maintain the pH between 4.5 and 5.5, this amount of sodium hydroxide solution causing precipitation of all the iron in the crystal product. The cobalt containing alpha FeOOH was isolated, dried and then converted to gamma $Fe_2O_3$ by a dehydration, reduction and oxidation process similar to that described in Example 1. The product contained 1.98 percent cobalt and an Hc equal to 4.29 and a squareness (j 10) of 0.70. * standard cubic feet per minute or hour.

EXAMPLE 6

A procedure was carried out similar to that of Example 1, except that no cobalt nitrate was used.

EXAMPLE 7

The products from Examples Nos. 1 through 6 plus two commercial samples of magnetic iron oxide identified as TODA-I and TODA-II were subjected to an X-ray analytical procedure. Shown in Table I are the X-ray diffraction spacings in Angstrom units, the cobalt content of the products and related coercivity value.

By a linear regression analysis procedure, it was determined that there is a straight line relationship between percent cobalt and change in X-ray spacing with a 95 percent degree of confidence in each instance.

The products prepared by the process of the invention all fall within this described straight line relationship. The two TODA commercial products are completely outside this straight line relationship as are also products prepared according to the prior art process of issued Patents, that is, the products prepared according to U.S. Pat. Nos. 2,978,414; 3,117,933; and 3,573,980.

Table I also details the second strongest X-ray diffraction peak for each of the products compared in the table. The value for each in A is accurate to ±0.0005. There is a straight line relationship between percent cobalt and change in X-ray spacing of the second strongest peak comparable to the relationship for the strongest peak in the X-ray diffraction pattern.

What is claimed is:

1. In the method of producing acicular cobalt doped ferromagnetic $Fe_2O_3$ by effecting an oxidation by passing an oxygen containing gas into a solution containing a water soluble ferrous salt and a water soluble cobaltous salt and then isolating non-magnetic alpha ferric oxide hydrate containing cobalt which is subsequently dehydrated, reduced and then oxidized to acicular cobalt doped gamma $Fe_2O_3$; the improvement which comprises passing the oxygen containing gas into the solution at a temperature of 15° to 50°C. and at a pH between 6.5 and 8 until the pH drops to between 3.5 and 6, heating the resulting slurry mixture to between about 65° and 100°C. and completing the oxidation with a gaseous oxidant while maintaining the pH between about 4 and 5.2 by the addition of an aqueous base solution.

* * * * *